J. H. REID.
PROCESS OF WELDING AND REPAIRING.
APPLICATION FILED DEC. 7, 1914.
1,246,658.
Patented Nov. 13, 1917.
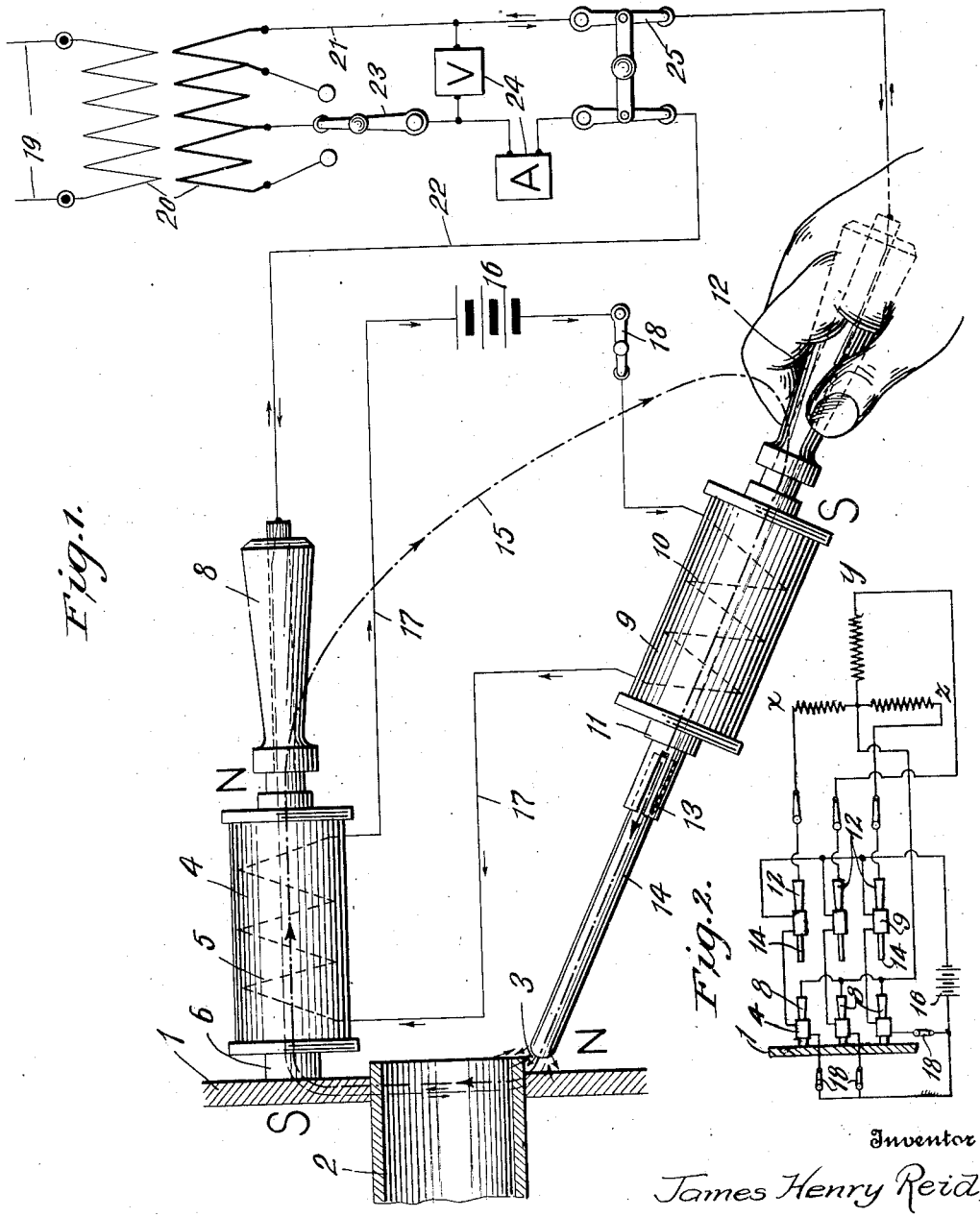
Inventor
James Henry Reid,
By Henry S Blackmore
Attorney
Witnesses
Chas. W. Stauffiger
F. L. Whitmer

UNITED STATES PATENT OFFICE.

JAMES HENRY REID, OF NEWARK, NEW JERSEY, ASSIGNOR TO THE SIEMUND WENZEL ELECTRIC WELDING COMPANY, A CORPORATION OF NEW YORK.

PROCESS OF WELDING AND REPAIRING.

1,246,658.  Specification of Letters Patent.  Patented Nov. 13, 1917.

Application filed December 7, 1914. Serial No. 875,749.

*To all whom it may concern:*

Be it known that I, JAMES HENRY REID, a citizen of the United States, residing at 352 Mulberry avenue, in the city of Newark, county of Essex, State of New Jersey, have invented certain new and useful Improvements in Processes of Welding and Repairing, of which the following is a specification.

This invention relates to the art of electric welding or repairing and means for performing same, and has for its object the utilizing of a plurality of electric currents and the provision of means for welding or repairing structures by the action of alternating and direct currents of electricity, acting as a reciprocating arc disposed between the article to be joined, welded, or repaired and the joining or repairing substance or metal in an efficient and economic manner and whereby welding, filling, cutting, shaping or other character of work may be performed at ordinarily inconvenient places which are hard to reach and which work may be performed in place or without taking down or removing the structure to be repaired, and also to provide means whereby these and other objects may be accomplished by a portable and readily handled device of simple and uncomplicated construction which can be readily adjusted and operated, and it comprises an arrangement of parts and combination of members capable of co-acting and coöperating in such a manner as to accomplish the desired result as hereinafter more fully set forth.

The invention comprises specifically the process of and means for utilizing magnetic lines of force for the magnetic coherence of substances to be united or joined and the magnetic spreading effect of such force for augmenting the welding or repairing operation. The said magnetic coherence or spreading induced by magnetic lines of force being employed in conjunction with a means such as a reciprocating arc induced by an electric current of alternating nature for maintaining a heated or fused condition of the substances to be joined or united, and also means whereby the material to be fused and joined to the structure to be mended or repaired may be supplied through the combined action of electric fusion and magnetism, which heating or fusing effect may be accomplished by the employment of alternating, polyphase, or induced currents of electricity of selective character, volume or intensity to produce the desired result.

The invention relates more particularly to that type of electric welding or repairing in which the parts to be joined are relatively fixed and require the application of a metal thereto, or the combining of a metal therewith, to complete the bonding or uniting of the parts and provides a means whereby the metal electrode is heated and fused by an electric arc of alternating nature and the heated or fused metal is retained in intimate contact with the article to be welded or repaired at the point to be repaired by magnetic action induced by a direct electric current separate from the welding current, thereby permitting the article to be efficiently welded with a minimum expenditure of energy and with little or no inconvenience to the operator and rendering its utilization in remote and restricted spaces or openings which may permit the use of only one hand of the operator, while at the same time a means is provided for use and utilization of alternating current which is more generally available and cheaper than direct current for accomplishing the result.

In the accompanying drawing Figure 1, is a diagrammatic view embodying the features of the invention and Fig. 2 is a diagrammatic view showing the application or employment of a polyphase current, such as a three phase current indicated as $x$, $y$ and $z$, and representing the circuits thereof as employed in the process including the same.

Similar numerals of reference represent corresponding parts in the several views.

In the drawing 1 represents a boiler head with a flue 2 to be welded into place the joining of the parts taking place as at 3.

Above the tube 2, or at other convenient location contiguous to plate 1, is placed an electric magnet 4 with winding 5 and core 6 said core being prolonged and forming a convenient handle 8.

Another electric magnet 9 with winding 10 and core 11 constitutes the welding tool, said core being prolonged to form a convenient handle 12 the opposite end of which is provided with a spring socket 13 to securely hold a fusible magnetic element 14 acting as an alternating current electrode and which is adapted to feed and supply the fused metal for welding or repairing.

The relative positions of the various parts as shown in the drawing, permit a continuous path for the magnetic lines through the work 2, the cores of the electric magnets 4 and 9, the fusible magnetic element 14 and the air as shown by the heavy dotted line 15. It is advisable that the relation of the above parts be maintained for the successful operation thereof.

The windings of the electromagnets are in electric connection with a battery 16, conductor 17 and switch 18.

Any convenient source of alternating current may be provided as at 19, said current being transformed to suit conditions by a transformer 20, having a controlling switch 23, a current measuring device 24, and a main switch 25 in circuit therewith.

Conductors 21 and 22 convey the current to and through the cores or the electromagnets, one of which is in electrical and magnetic contact with the plate 1, the other electro-magnet being in electrical and magnetic contact with the joint as at 3 through the medium of the core 11 the fusing element 14 and the reciprocating arc thereby forming a closed path for the alternating, polyphase, or other electric welding current.

In the operation of the device the electromagnets are energized by the closing of the switch 16 and the placing of one of said magnets in position as shown in the drawing, the other electro-magnet is manipulated by the operator in such a manner as to bring the fusing element in contact with the work and spot to be welded or repaired at which time the switch 25 is closed causing the current to flow through the parts to be welded and the fusing or welding element, the resistance of which is sufficient to cause heating and consequent plastic condition for the efficient welding or repairing of the parts.

The employment of a magnetic condition in the parts to be welded has two functions, first, to provide a readily attached and efficient contact for the passage of the electric current therethrough, and second, to assist the flow of metal around the joint, it being known that a paramagnetic substance tends to flow away from or with the lines of force.

The accompanying drawing merely illustrates one application of my device, it being understood that details of construction and the arrangement of parts thereof may be varied so long as the members co-act and coöperate to produce the desired result without changing the substance of or spirit of the invention.

By employing a portable alternating current arc, in conjunction with magnetic lines of force induced by a direct current, for heating and fusing the joining and welding parts and supplying metal thereto through the medium of a reciprocating arc in accordance with the present invention, the operation is performed in a more simple and economical manner and a more perfect and uniform heating is secured by reason of the equal heating of the alternating current electrodes by or through the intervening reciprocating arc of the alternating current, and the oxidation of either electrode is prevented, which is not the case when a direct current arc is employed which impinges on the anode, superheating the same and oxidizing it, and when this single direct current is employed for fusing a metal to be supplied to the object or body to be welded or joined the metal to be supplied which is fused is necessarily the anode and becomes oxidized as such before being supplied, and the point to be welded is also relatively cooled (being the cathode), all of which difficulties and defects in the successful performance of the welding process as thus carried out in the prior art, depending on the employment of direct current alone augmented by magnetic lines of force, are obviated by the employment of an alternating current arc in conjunction with magnetic lines of force induced by a separate direct current said arc reciprocating between the article to be repaired and an electrode of repair metal forming the subject matter of the present invention.

It will also be noted that in the present invention the metal supplied to the object welded or joined forms a part of the core of a direct current magnet or plurality thereof and said core is fused and supplied by heat induced by a separate alternating current arc which equally heats between the point to be joined and the point of fused joining metal supply and provides a uniform supply of metal and the supply of the same to a part to be joined in a selectively heated condition to receive the same and unite therewith and provides a superior non-oxidizing condition of the parts over that resulting from the use of a direct current alone.

The alternating current employed to produce a reciprocating arc, fuse the repair metal electrode, and join, weld, or repair the article treated may be derived directly from a generator or through the medium of a transformer or other current altering or changing device, and the reciprocating or fluctuating arc may be altered, directed, or diverted by the action of magnetic lines of force or magnetism derived from any convenient source or position whereby the arc may be contracted or elongated as required between the electrode of the repair metal and the article to be repaired, welded, or joined, to accomplish the desired result.

Having now described my invention what

I claim as new and desire to secure by Letters Patent is:—

1. The process of electric welding or repairing, which comprises exposing the object to be welded or repaired to the combined action of an alternating current arc and magnetism disposed between it and an electrode of the joining or repairing metal or substance.

2. The process of electric welding or repairing, which comprises exposing the object to be welded or repaired to the combined action of an alternating current arc and magnetism disposed between it and an electrode of the joining or repairing metal or substance, and supplying metal thereto during the process of operation.

3. The process of electric welding or repairing, which comprises exposing the object to be welded or repaired to the combined action of an alternating current arc capable of heating to a point selective to produce the result desired and magnetism disposed between it and an electrode of the joining or repairing metal or substance, and supplying metal thereto during the process of heating.

4. The process of electric welding or repairing which comprises fusing and supplying metal to the object to be welded or repaired by action of an alternating current arc while subjected to magnetic lines of force disposed between it and an electrode of the joining or repairing metal or substance.

5. The process of electric welding and repairing, which comprises exposing the object to be welded or repaired to the combined action of a polyphase current and magnetism disposed between it and an electrode of the joining or repairing metal or substance.

6. The process of electric welding and repairing, which comprises exposing the object to be welded or repaired to the combined action of a polyphase current disposed between it and an electrode of the joining or repairing metal or substance and magnetism disposed between it and an electrode of the joining or repairing metal or substance, and supplying metal thereto during the process of operation.

7. The process of electric welding and repairing, which comprises exposing the object to be welded or repaired to the combined action of a polyphase current, capable of heating to a point selective to produce the result desired and magnetism disposed between it and an electrode of the joining or repairing metal or substance, and supplying metal thereto during the process of heating.

8. The process of electric welding and repairing which comprises fusing and supplying metal to the object to be welded or repaired by action of a polyphase current while subjected to magnetic lines of force disposed between it and an electrode of the joining or repairing metal or substance.

9. The process of electric welding and repairing, which comprises heating the joining metal by an alternating current and joining the parts desired while under magnetic coherence disposed between it and an electrode of the joining or repairing metal or substance.

10. The process of electric welding and repairing, which comprises fusing the joining metal by an alternating current and joining the parts desired while under magnetic coherence disposed between it and an electrode of the joining or repairing metal or substance.

11. The process of electric welding and repairing, which comprises fusing the joining metal by an alternating current disposed between it and an electrode of the joining or repairing metal or substance, and spreading and joining the parts desired with the fluid joining metal while under magnetic coherence and by magnetic action.

12. The process of electric welding and repairing, which comprises fusing and supplying a joining metal to the object to be joined or repaired through an arc disposed between the article to be welded or repaired and an electrode of the welding or repairing metal or substance by the action of an alternating current conveyed through a plurality of magnetic cores actuated by a direct current.

13. The process of electric welding and repairing, which comprises directing an alternating current arc disposed between the article to be welded or repaired and an electrode of the welding or repairing metal to the part to be welded by the action of magnetic lines of force induced by a direct current.

14. The process of electric welding and repairing, which comprises directing an alternating current arc disposed between the article to be welded or repaired and an electrode of the welding or repairing metal to the part to be welded by the action of magnetic lines of force induced by a direct current and supplying a welding metal by fusion of a portion of such magnet core by alternating current passed therethrough.

15. The process of electric welding and repairing which comprises heating the article to be welded or repaired constituting an electrode, and the welding or repairing metal constituting an opposite electrode, by an arc disposed and reciprocating between the article to be welded or repaired and an electrode of the welding or repairing metal or substance.

16. The process of electric welding and repairing which comprises heating the article to be welded or repaired and the welding or repairing metal by a magnetically directed reciprocating arc disposed between the article to be welded or repaired and an electrode of the welding or repairing metal or substance.

17. The process of electric welding and repairing which comprises heating the article to be welded or repaired by a magnetically directed reciprocating arc disposed between the article and another electrode.

18. The process of electric welding and repairing which comprises heating the article to be welded or repaired by a magnetically concentrated and directed arc disposed and reciprocating between the article and another electrode.

19. In the process of welding and repairing, the step which includes the spreading of molten metal by the blast caused by the rupture of the magnetic force due to the fusion of the metal disposed between the article to be welded, constituting one electrode, and an opposite electrode in an electric arc, while successively impinging on both.

In testimony whereof I affix my signature in the presence of two witnesses.

JAMES HENRY REID. [L. S.]

Witnesses:
PHILIP LOFT,
L. HALSEA CROSIER.